(12) United States Patent
Daley et al.

(10) Patent No.: US 8,717,850 B2
(45) Date of Patent: May 6, 2014

(54) PIEZOTUBE BOREHOLE SEISMIC SOURCE

(75) Inventors: Tom M. Daley, Oakland, CA (US); Ray D. Solbau, Crescent City, CA (US); Ernest L. Majer, Orinda, CA (US)

(73) Assignee: The Regents of the University of California, Oakland, CA (US)

( * ) Notice: Subject to any disclaimer, the term of this patent is extended or adjusted under 35 U.S.C. 154(b) by 632 days.

(21) Appl. No.: 12/444,136

(22) PCT Filed: Oct. 30, 2007

(86) PCT No.: PCT/US2007/082940
§ 371 (c)(1),
(2), (4) Date: Dec. 1, 2010

(87) PCT Pub. No.: WO2008/127390
PCT Pub. Date: Oct. 23, 2008

(65) Prior Publication Data
US 2011/0315471 A1  Dec. 29, 2011

(51) Int. Cl.
*G01V 1/04* (2006.01)
(52) U.S. Cl.
CPC .................................... *G01V 1/04* (2013.01)
USPC .......................................................... 367/189
(58) Field of Classification Search
USPC .......................................................... 367/185
See application file for complete search history.

(56) References Cited

U.S. PATENT DOCUMENTS

| | | | |
|---|---|---|---|
| 3,660,809 A * | 5/1972 | Pearson .................. | 367/152 |
| 4,039,042 A | 8/1977 | Edwards et al. | |
| 4,742,495 A | 5/1988 | Medlin et al. | |
| 5,343,001 A | 8/1994 | Cowles et al. | |
| 6,390,191 B1 | 5/2002 | Melson et al. | |
| 7,095,676 B2 * | 8/2006 | D'Angelo et al. ............... | 367/31 |
| 7,681,450 B2 * | 3/2010 | Bolshakov et al. ............. | 73/582 |
| 7,880,368 B2 * | 2/2011 | Sawada et al. ................ | 310/334 |
| 7,902,722 B2 * | 3/2011 | Vilkomerson ................ | 310/322 |
| 7,911,876 B2 * | 3/2011 | Hurst et al. ..................... | 367/25 |
| 2003/0042026 A1 | 3/2003 | Vinegar | |
| 2003/0117025 A1 | 6/2003 | Rouquette | |

(Continued)

FOREIGN PATENT DOCUMENTS

GB  751568  6/1956
WO  WO 2008127390 A2 * 10/2008

OTHER PUBLICATIONS

International Search Report and Written Opinion for International Application No. PCT/US2007/082940 mailed Oct. 20, 2008.

(Continued)

*Primary Examiner* — Isam Alsomiri
*Assistant Examiner* — James Hulka
(74) *Attorney, Agent, or Firm* — Lawrence Berkeley National Laboratory

(57) ABSTRACT

A piezoelectric borehole source capable of permanent or semipermanent insertion into a well for uninterrupted well operations is described. The source itself comprises a series of piezoelectric rings mounted to an insulative mandrel internally sized to fit over a section of well tubing, the rings encased in a protective housing and electrically connected to a power source. Providing an AC voltage to the rings will cause expansion and contraction sufficient to create a sonic pulse. The piezoelectric borehole source fits into a standard well, and allows for uninterrupted pass-through of production tubing, and other tubing and electrical cables. Testing using the source may be done at any time, even concurrent with well operations, during standard production.

20 Claims, 5 Drawing Sheets

(56) References Cited

U.S. PATENT DOCUMENTS

| | | | |
|---|---|---|---|
| 2003/0185100 A1* | 10/2003 | D'Angelo et al. | 367/82 |
| 2004/0218725 A1 | 11/2004 | Radley et al. | |
| 2007/0131417 A1* | 6/2007 | Bolshakov et al. | 166/250.13 |
| 2007/0293762 A1* | 12/2007 | Sawada et al. | 600/459 |
| 2009/0005991 A1* | 1/2009 | Hurst et al. | 702/6 |
| 2009/0183941 A1* | 7/2009 | Pabon et al. | 181/102 |
| 2009/0251028 A1* | 10/2009 | Vilkomerson | 310/334 |

OTHER PUBLICATIONS

Daley, T.M., Solbau, R.D., Ajo-Franklin, J.B. & Benson, S.M., 2007. Continuous active-source seismic monitoring of CO2 injection in a brine aquifer, Geophysics, 72, A57-A61.

* cited by examiner

PIEZOTUBE BOREHOLE SEISMIC SOURCE

STATEMENT REGARDING FEDERAL FUNDING

This invention was made with U.S. Government support under Contract Number DE-AC02-05CH11231 between the U.S. Department of Energy and The Regents of the University of California for the management and operation of the Lawrence Berkeley National Laboratory. The U.S. Government has certain rights in this invention.

CROSS-REFERENCE TO RELATED APPLICATIONS

This application claims the benefit of priority to PCT Application No. PCT/US2007/082940, which in turn claims priority to U.S. provisional application 60/863,914 filed Nov. 1, 2006, which applications are incorporated by reference in their entireties, as if fully set forth herein.

BACKGROUND OF THE INVENTION

1. Field of the Invention

The present invention generally relates to the field of seismology, and more particularly to seismic sources, and most particularly to a piezoelectric borehole seismic source which may be emplaced into an active or inactive well in a permanent or semi-permanent manner.

2. Description of the Relevant Art

Currently, the standard way for addressing the need for producing borehole source waveforms is to lower a borehole source on a cable down an existing borehole. Due to the large diameters of the existing sources, concurrent well operation is impractical. Therefore, existing sources must be lowered, used, and then retracted. More importantly, for operating wells, production must be stopped, and production tubing retracted and removed before the desired tests can be conducted with the source in place. The source is then removed and production tubing replaced. This can be particularly expensive and time consuming when it is desired to take seismic readings at depths of several thousands of feet over extended periods of time. For pressurized wells, such as those used to inject or withdraw fluids and gases such as methane, oil, water or $CO_2$, etc., pressure caps must additionally be used. As can be readily seen, such procedure is fraught with the possibility of borehole damage, and is extremely time consuming and labor intensive.

Accordingly what is needed in the oil and gas industry is a method of providing in-situ seismic source energy that may be generated as needed, concurrently with the operation and/or production of an existing well. Such continuous capabilities can be particularly useful in the monitoring of the condition of an oil field, or any other instance where fluids are injected or withdrawn from the ground using boreholes, such as when they are pumped down or have gases or fluids injected to facilitate oil extraction or any other fluid injection or withdrawal. The novel source described here is capable of performing such function, while not interfering with the continuous operation of the well, additionally allowing still other benefits such as pass through of needed gas and electrical lines from above to below the source.

BRIEF SUMMARY OF THE INVENTION

This invention provides a borehole seismic source apparatus, comprising: a) a mandrel defining a cylindrical passageway, the passageway in one embodiment slightly larger than the diameter of the production well tubing to which it will be secured (thus allowing for the free flow of fluids through the well) b) one or more cylindrical piezoelectric sources longitudinally mounted along the mandrel; c) a housing to enclose the piezoelectric sources to define a cavity wherein electrically insulative and/or protective material may be contained; and d) an actuation means for causing one or more of the piezoelectric cylindrical sources to change dimension, whereby a sonic pulse is generated. In one embodiment, the cavity defined by the housing contains within it an insulator material. In another embodiment the insulator material is a fluid that immerses the piezoelectric sources. In yet another embodiment, the source may additionally include a pressure compensator projecting from the piezo housing and in fluid communication with the fluid filled cavity, whereby pressure inside the piezo housing and an exterior ambient pressure are equalized. In yet another embodiment the housing of the borehole seismic source apparatus is mounted off-center to the piezoelectric encased mandrel. This eccentricity provides an increased space through which control lines can be passed through, thereby facilitating the linking of conduits above and below. The conduits may be used for pipes and wires which carry electrical power, data, fluids, and/or other borehole relevant lines. The piezo housing is made of a corrosion resistant material, typically stainless steel, or other resistant material such as titanium, etc.

In operation, the borehole seismic source apparatus is mounted to a section of borehole tubing. In one embodiment, a segment of borehole tubing is first passed through the defined cylindrical space of the mandrel, and the borehole source thereafter removably secured to the tubing. The securing function can be performed using any suitable means, such as pipe clamps tightened around tabs which extend from the source apparatus. By this arrangement, with the seismic source in place, it is possible to continue normal operation of the well, passing fluid or gas either up or down in direction without interruption. In this manner, the borehole source may be positioned for intermittent use, and left in place for long periods of time, such as days, weeks, months, or even years. This is in stark contrast to sources which are lowered on special lines, and that do not work in the very limited space between production tubing (typically having an outer diameter of about 2.375 inches), and the wall of the borehole (typically as small as about 5 inches), or the inner wall of borehole casing used to clad the hole (typically as small as 4.825 inches for a 5 inch well).

The piezoelectric material generates a sonic seismic wave by rapidly changing its shape by a single or a series of positive and/or negative pulses. This is done using an AC current to provide rapidly successive positive and negative charges to the material. In this manner the piezoelectric cylindrical sources will first expand or contract in one direction and then quickly reverse and contract or expand in the other.

The actuation means used to accomplish this may comprise: a) an inner conductor in electrical connection with an inner radius of at least one of the piezoelectric sources; and b) an outer conductor in electrical connection with an outer radius of the same piezoelectric source; whereby the dimension that changes is a radial dimension of the piezoelectric cylindrical source.

In another embodiment, a copper braid is either soldered or brazed to each piezoelectric cylinder on the outer radius. The braids can be covered with a protective tape. The braid, or wire conductor, is then fed to a feed through that passes through the top of the piezo housing. Similarly, the inner conductor wire is in electrical contact with the inner radius of the piezoelectric sources, covered if desired with a protective tape, and fed through the piezo housing in an insulated feedthrough. Both conductors are passed to the top of the well via cabling that provides for electrical and mechanical isolation of the conductive lines from the harsh environment of the working well.

The piezoelectric cylindrical elements may be provided either as a single unit, or more commonly as a set of units coaxially mounted about the mandrel. In one experimental unit, 18 such cylindrical segments were mounted coaxially, with o-rings or other compliant material situated between each set of the segments, and end rings positioned at the far ends. The O-rings and end rings serve to both retain the segments in place, reduce the probability of breakage due to impact of one piezo segment with another, and to electrically isolate each of the piezo elements one from the other. In one embodiment each of the piezoelectric segments are identical in construction, such that energized they generate the same sonic seismic wave, thereby allowing for higher seismic output and better focus of the seismic energy. While the number of cylindrical elements used is not critical, notably, the more elements employed, the stronger will be the generated seismic pulse.

To distribute charge evenly over the piezoelectric segments, each of the segments is coated with a conductive material on the interior and exterior cylindric walls. In one embodiment the conductive material may be silver, and in another it may be a conductive epoxy, etc. Such conductive material may be coated by techniques well known in the art such as vacuum coating, chemical vapor deposition, or magnetron sputter deposition. In the process, the edges of the piezo segments are covered, such that the conductive coatings on the inside and outside of the cylindric parts are maintained in electrical isolation.

For an ideal source, it should behave as a point source. Thus, the total length of the piezoelectric borehole source should in the ideal context be short compared to the wavelengths of acoustic energy to be generated. One useful criterion is that the length of the source should be less than 0.1 of the wavelength of use, for what is known as a $\lambda/10$ criterion, where $\lambda$ is the wavelength of interest. Thus a trade-off exists between the desire for a point source, and the strength of the source. Constructed field units have been between 5 and 6 feet in length, with the active elements being 3 to 4 feet in length, therefore somewhat longer than the $\lambda/10$ criterion.

The insulator material contained within the source housing may be an insulating fluid such as Diala AX (an oil manufactured by Shell Oil Company) or any other compatible fluid having dielectric properties sufficient to prevent electrical arcing between the piezoelectric cylindrical sources and the housing when the unit is electrically driven. In addition to its insulating properties, the insulator material should preferably have the compressibility of a fluid such that seismic energy is not damped between the piezoelectric crystals and the outer housing.

The pressure compensator used in connection with deep well operation may comprise a cylinder slidably mounted within a tube which is attached and sealed to the piezo housing, whereby the cylinder slides to provide an adjustable volume responsive to changes in the pressure internal to the piezo housing relative to a pressure external to the housing. In the field, it has been found, for example, that temperature variations of the insulating fluid alone can lead to large excursions of fluid volume, such as was observed after leaving the piezoelectric borehole source under a hot sun for a period of time, which caused the pressure compensator to noticeably adjust. Similarly, volume adjustments occurred when the source was tested in a well borehole at about 70° C. and 2500 psi ambient at a depth of about 5500 feet.

In one embodiment of the invention a method is provided for generating a piezoelectrically driven borehole seismic source wave comprising: a) positioning a piezoelectric borehole source relative to a section of borehole production tubing; b) removably coupling the piezoelectric borehole source to the borehole production tubing; c) lowering the borehole production tubing including the piezoelectric borehole source down a borehole; and d) applying a voltage to one or more piezoelectric elements contained within the piezoelectric borehole source to thereby generate a source wave due to application of a voltage to the piezoelectric elements. The removably affixing step may be as simple as tightening clamps to tabs on the piezoelectric borehole source to secure it to the production tubing. Such clamps may be stainless steel hose clamps readily available at places including, but not limited to automotive and hardware stores.

The method above may further comprise immersing the individual piezoelectric elements in a dielectric fluid. The fluid prevents breakdown due to high voltages applied to the piezoelectric elements, which result in high voltage field gradients that tend to initiate electrical breakdown and consequent arcing. The applying of a voltage step may comprise applying a sine or square wave AC current with a frequency of 100 Hz to 5 kHz; and applying the sine or square wave current at voltages ranging from $\pm 100$ V to 5 kV. In a field experiment, a 1 millisecond wide pulse was applied at a rate of about 10 Hz with voltage amplitudes ranging from 1 kV to 3 kV, although the design of the source would allow higher or lower amplitudes.

It is clear that with the ability to pass-through both the production tubing and additional control lines, multiple, individually addressable piezoelectric borehole sources may be simultaneously emplaced into a given well, as will be more fully described hereinafter.

BRIEF DESCRIPTION OF THE SEVERAL
VIEWS OF THE DRAWINGS

The invention will be more fully understood by reference to the following drawings, which are for illustrative purposes only:

DETAILED DESCRIPTION OF THE PREFERRED
EMBODIMENT

Definitions

Piezoelectric means a material that changes its dimension in response to an applied voltage.

Production tubing is the piping that is connected segment by segment and placed in a well to enable fluid or gas insertion or extraction from the well.

Introduction

This invention addresses several technical problems presently extant with borehole seismic sources. First, this piezoelectric borehole source allows for permanent or semipermanent insertion into a well. This obviates the expensive and time consuming process of retrieving production tubing, lowering a temporary source into the well, taking measurements, and then replacing the production tubing. Second, this source allows for necessary tubing and electrical runs that pass along side of the production tubing to also pass through the piezoelectric borehole source. Third, the source is piezoelectric in nature, and can thereby be activated as needed on a continuous or intermittent basis by simple electrical activation. Follow up tests due to data anomalies are simple since the test merely needs to be redone. In this implementation, since the piezoelectric source never leaves the well, test to test variations in the borehole due to insertion and extraction damage are eliminated.

Device Description

Figure 1:
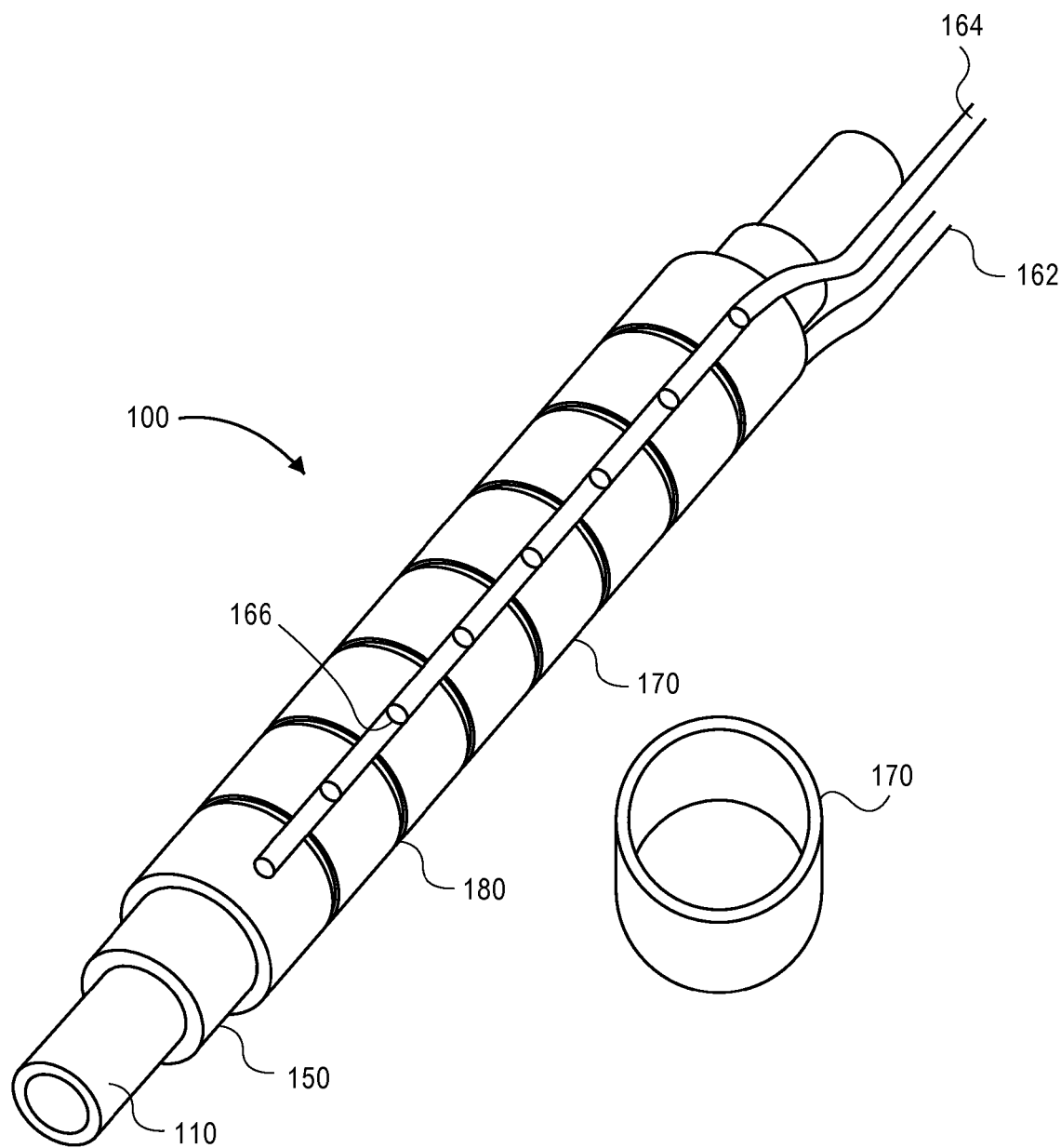
FIG. 1 is a partially disassembled 3 dimensional view of the major components of the piezoelectric borehole source, with minor details omitted.

Referring now to FIG. 1, illustrated is a partially opened depiction of the major components of a piezoelectric borehole source 100. Production tubing 110, here shown with the piezoelectric borehole source attached, is usually not present when the piezoelectric borehole source is constructed. Presently, a simple PVC pipe is used to mimic the production tubing during fabrication. An electrically insulating mandrel 150 is fabricated from an inherently dielectric material such as fiberglass, and forms the next cylindrical section out from production tubing 110.

Figure 2:
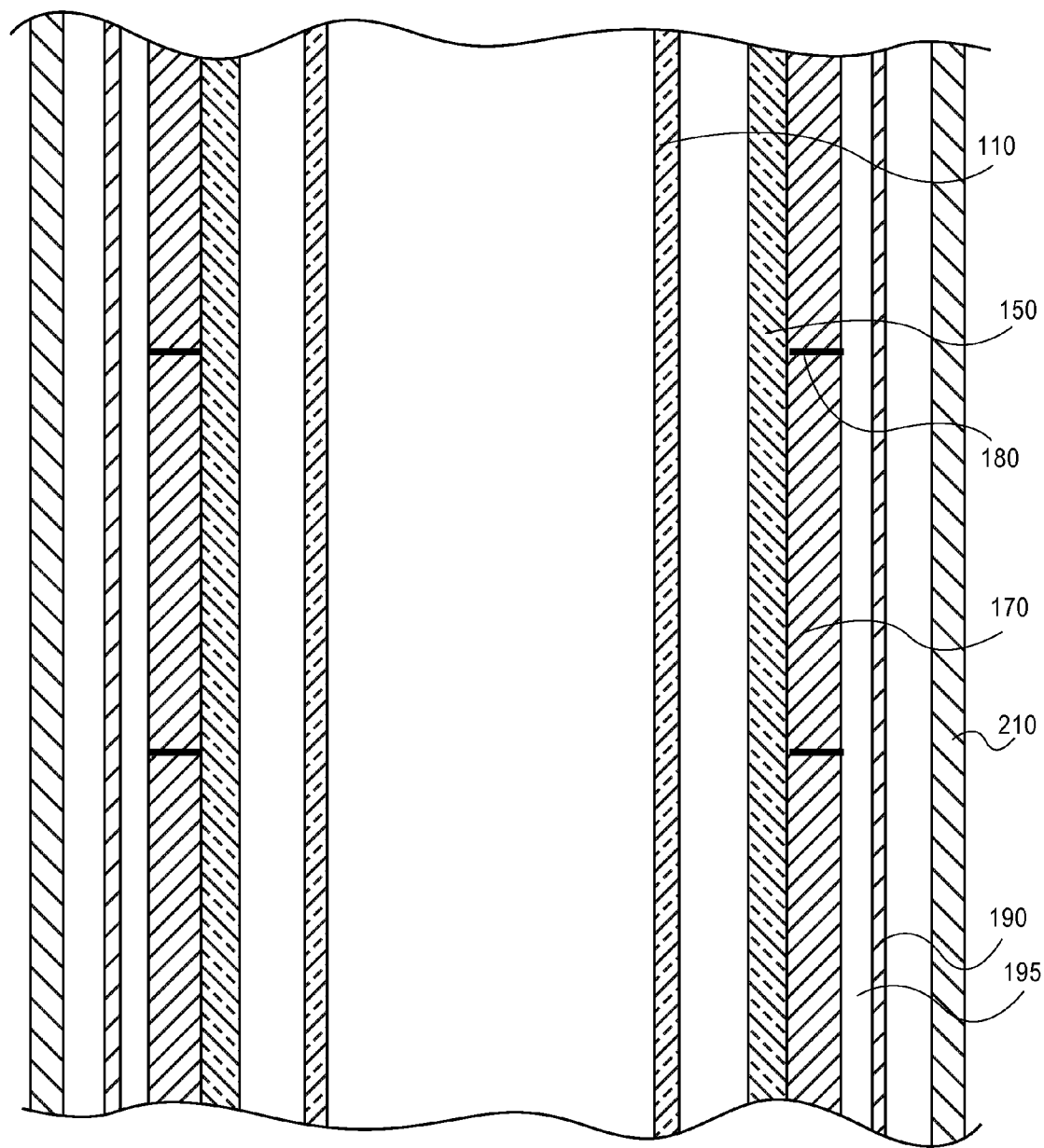
FIG. 2 is a sectioned longitudinal cross section of a piezoelectric seismic source according to an embodiment of this invention.
Figure 3:
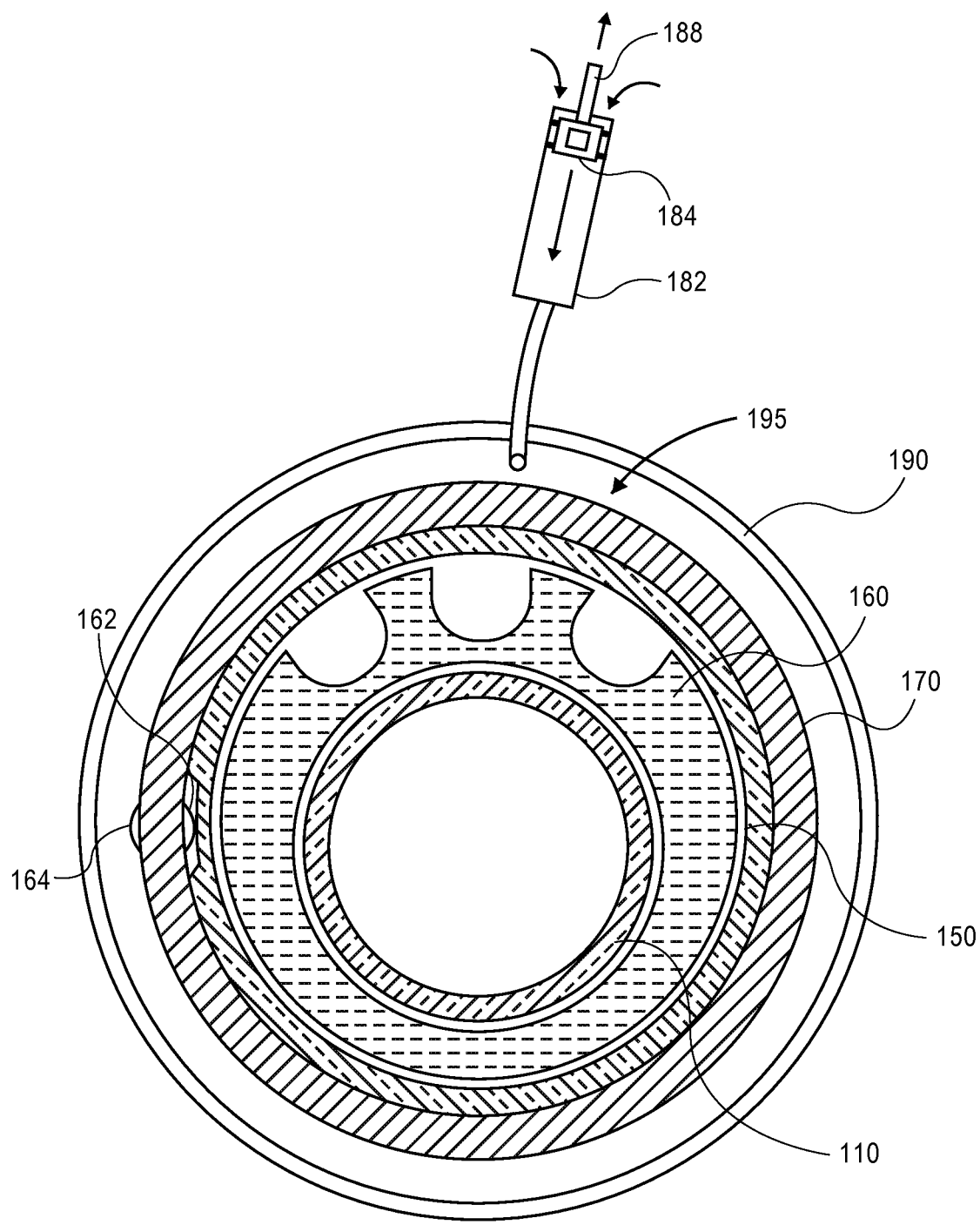
FIG. 3 is a radial cross section of the seismic source according to an embodiment of this invention.
Figure 4:
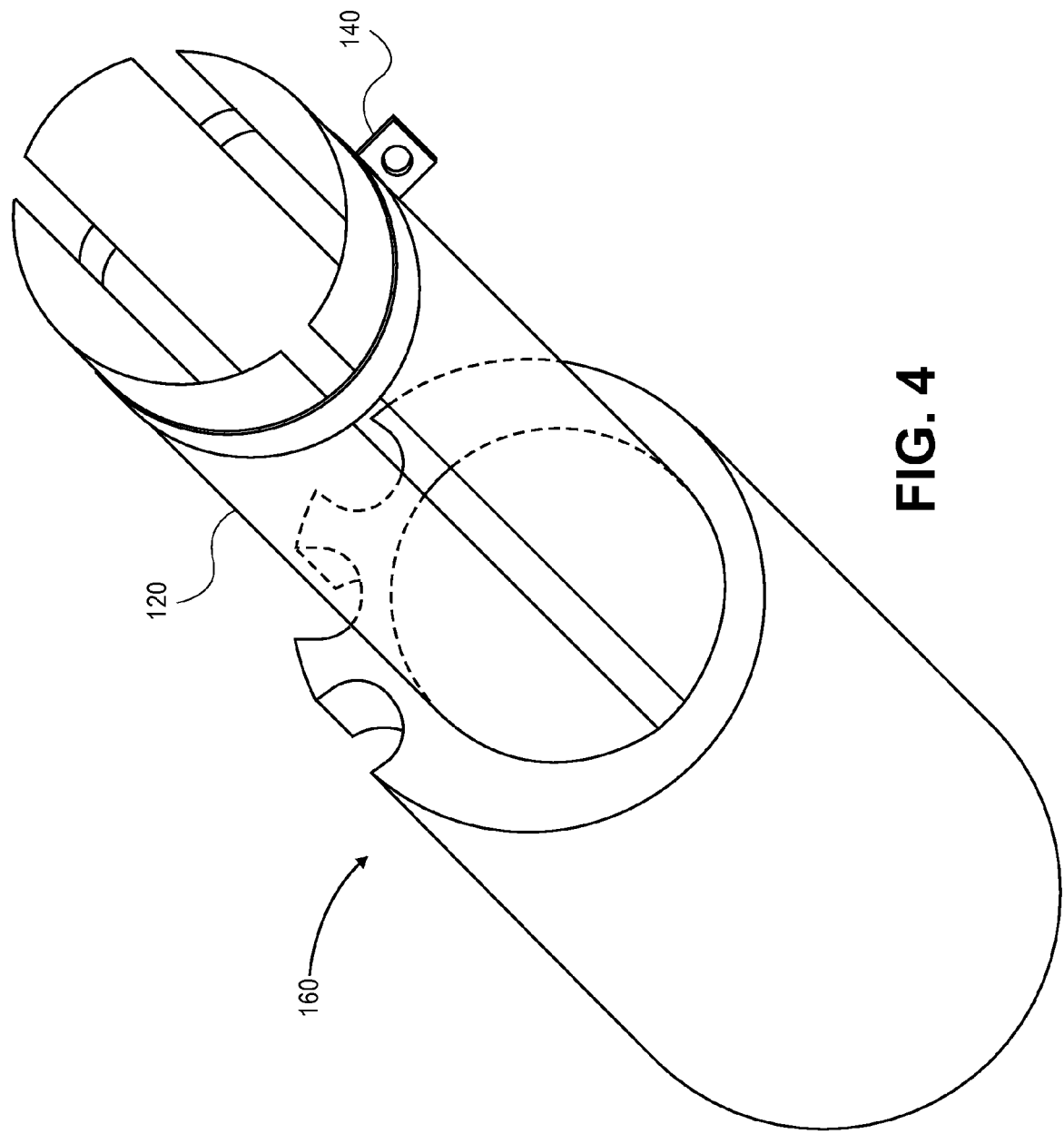
FIG. 4 is a three dimensional schematic of an asymmetric spacing collar according to an embodiment of the invention.

In one embodiment, the inner diameter of mandrel 150 is slightly larger than the outer diameter of tubing 110 to provide a slip fit. In another embodiment, the inner diameter of the mandrel may be substantially larger than the outer diameter of tubing 110 (such as is the case if FIG. 2), and a spacer at each end of mandrel 150 used to position the source 100 relative to tubing 110. Here tabs or sleeves extending from the spacer may be used to secure the seismic source to production tubing 110 by simple tab-to-tube fasteners. In this embodiment, where the spacer is asymmetric, item 160 of FIGS. 3 and 4, the central axis of tubing 110 is offset from the central axis of source 100, the annular space there between thus increased on one side, and through which cables, electric lines, etc. may be passed. As shown in FIG. 4, asymmetric spacer 160 includes a number of circumferential tab or sleeve sections 120 extending therefrom, which sleeves are separated one from the other to allow for limited radial movement of the sleeves at their free ends. The sleeves define a cylindrical space at their base sized slightly larger in diameter than the diameter of the well tubing 110, to allow unit 100 to be slid over a selected section of tubing 110, and simple hose clamps 140 used to tighten down the ends of sleeve sections 120 about the tubing, thus securing source 100 in place.

In still another embodiment, the mandrel can be manufactured to the same internal diameter of the well pipe, and provided with direct connect fittings, in essence forming a pipe section extension. In all of these embodiments, the well fluids/gases are allowed to flow freely, with the seismic source in place.

Cable wires 162 and 164 in FIG. 1, which in one embodiment are incorporated into a coaxial cable 163 in FIG. 4, make electrical connection to one or more piezoelectric elements 170. Wire 162 running along the outer wall of mandrel 150 is electrically connected to the inside wall of the piezoelectric rings 170, and wire 164 is similarly electrically connected to the outside walls of the piezoelectric rings. A voltage applied between the two wires in cable 163 will therefore be applied to the piezoelectric rings, generating the sonic waves. In one embodiment, both wires 162 and 164 are isolated from any electrical 'ground', such as the steel pipe. Wire 164 can be spot soldered (item 166 in FIG. 1), brazed or otherwise mechanically and electrically connected to the outer diameter of the piezoelectric elements 170. Wire 162 may be similarly brazed or soldered to the inner diameter of the piezoelectric elements 170.

For multiple stacked piezoelectric elements 170 one or more compliant spacers 180 are interspersed to prevent mechanical damage during well insertion. A typical compliant spacer 180 would be an O-ring with sufficient diameter and thickness to also prevent damage to adjacent piezoelectric elements 170 in expansion mode. The O rings must further be electrically insulative, compositionally compatible with the insulative fluid maintained within the source housing, and are typically formed from an insulative rubber. Notably, while most of the contraction or expansion of elements 170 is in the radial direction, there is limited expansion/contraction longitudinally. Thus the spacers serve to both space and cushion the individual elements to prevent damage as they change dimension, as well as electrically isolate one element from the other.

A piezo housing 190 covers all of the stacked piezoelectric elements 170, and is provided with an end cap (not shown) positioned at each of the two ends of the housing to hydraulically seal an interior region 195 defined between the outer walls of elements 170 and inner wall of housing 190. Passageways interior to the end caps allow for wires 162 and 164 to pass through housing 190.

In an embodiment of the invention, a dielectric fluid can be placed into the interior free space 195 of the piezo housing 190, thus immersing the piezoelectric elements 170, and wires 162 and 164 in a dielectric medium. This is to prevent arching between elements 170 and housing 190 when the source is in use.

Further, a pressure compensator (shown in FIG. 3) can be provided to relieve pressure differences between the interior 195 of piezo housing 190, and whatever ambient pressure the device finds itself. While not required for shallow well monitoring, such a compensator is especially important in deep well monitoring where pressures can reach a few thousand psi. In one embodiment, the compensator is a tube 182 open at one end connected to the interior piezo housing volume, and at the other end open to environment of the well. Positioned inside the tube is a short length piston 184, the piston in one embodiment having two O rings secured around its circumference, one at each end. The piston slidably engages the tube for back and forth translation in response to pressure induced changes in the fluid volume within the housing. In this set up, after the housing interior is filled with transformer fluid, the piston is moved close to its central position. In operation, the slidable cylinder can travel to the end of the tube until it meets an internal snap ring (not shown) which prevents the piston from exiting the tube, thus allowing for a net volumetric change of the fluid in the interior piezo housing volume. Additionally, an over-pressure vent valve 188 is provided in the piston to allow for release of fluid in the event the pressure compensator is no longer able to adjust to internal over-pressures.

Device Operation

In operation, the piezoelectric borehole source 100 is slid over production tubing 110, and secured to the production tubing with tab-to-tubing fasteners, typically at both ends. Additional necessary tubing and wires are fed through the piezoelectric borehole source 100 through the end sections. In one embodiment, as shown in FIG. 3, the cylindrical piezoelectric elements 170 are eccentrically mounted about the production tubing center, which allows for the feeding of the additional tubing and wires necessary for well production or operation.

Figure 5:
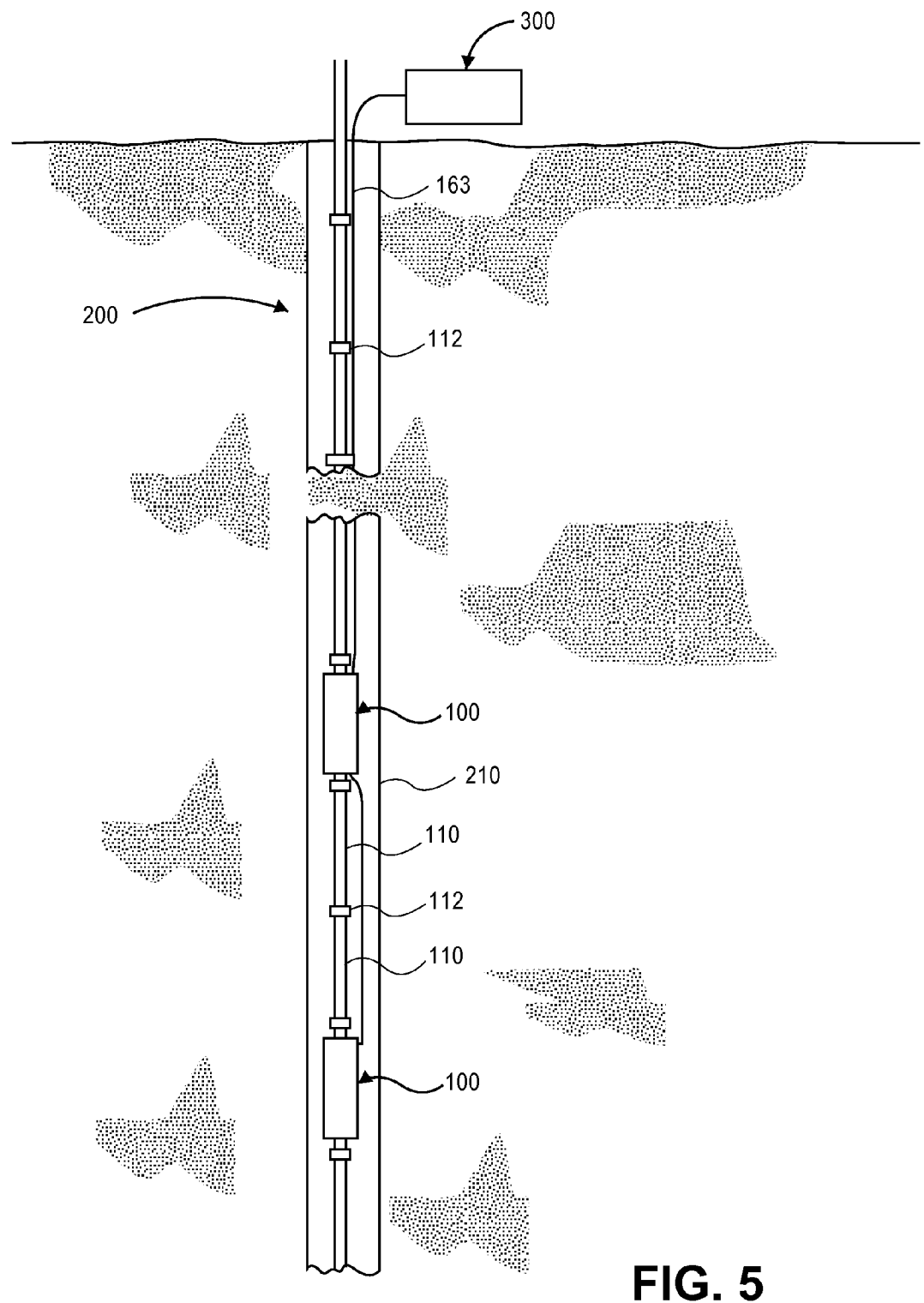
FIG. 5 is a schematic of a well set up, illustrating the installation along the well pipe of two seismic sources of the invention.

The piezoelectric borehole source 100, now mounted over the production tubing 110, is placed into the well to the desired depth. The source, affixed to a standard section of well tubing becomes incorporated as part of the overall tubing string. It is also possible to incorporate multiple sources into a tubing string, if it is desired to take readings from different depths, as illustrated in FIG. 5 (not to scale). Here, well 200 is defined by borehole casing 210. Sections of well tubing 110 (typical production tubing is provided in 30 foot lengths, having an outer diameter of 2.375 or 2.875 inches) are secured one section to the other at male-female connections 112. Individual tubing strings can be of any length, and typically for oil well production may extend down as much as 5,000-7000 feet or more. In a fluid filled well, at such depths pressures encountered can be as high as 2600 psi or more. Thus, the pressure compensator discussed previously serves to prevent collapse of the seismic housing surrounding the seismic source.

For seismic imaging to occur, the piezoelectric borehole source 100 is sent a high voltage AC signal from power source 300 over cable 163. The cable that brings the signal and ground wires down the well to the borehole source is in one embodiment strapped to the well tubes. In the case where multiple sources are employed, as illustrated in FIG. 5, the cable can be threaded through the asymmetric void defined by asymmetric spacers 160. In one embodiment a single multiconductor cable could be used with separate wires for each source.

Voltage pulses from power source 300 simultaneously excite a multiplicity of piezoelectric elements 170. In the positive phase of the signal, in one embodiment employing a commercially available ceramic piezoelectric material such as one comprising substantially lead zirconate or barium titinate, the cylindrical ring will expand. In the negative phase of the electrical signal, the cylindrical ring will contract. Cycled at anywhere between 100 Hz to 10,000 Hz, and in one embodiment between 500 Hz to several KHz, the rapid change in dimension over the course of a few milliseconds results in a snapping or pinging acoustic sonic wave pulse, one that is radially dispersed. When the power source is turned off, elements 170 will return to their original dimensional configuration.

Cross-well seismic monitoring is possible using devices either mounted in adjacent wells, or on the surface to detect these acoustic pulses after transmission through the geological medium. The data collected from the various detectors can be fed into standard image processing software to develop a seismic map for the geological medium around the piezoelectric borehole source. In an embodiment of this invention, a commercially available receiver can be used as a receiver in the monitoring well. In another embodiment the hydrophone can be the piezoelectric elements of this invention. In this embodiment, the transmitted pressure waves upon reaching the receiver cause the cylindrical piezoelectric sections to change dimension. By monitoring the voltage and current across the piezoelectric sections, one can measure voltage changes induced by these changes in the dimension of these components In this mode, using piezoelectric seismic source as the sensor, amplification of the detected signal is typically required. Further, it is necessary that the monitoring well be fluid filled (or otherwise able to transmit seismic energy), and interior region 195 of sensor 100 be fluid filled as well to facilitate transmission of seismic wave energy between the borehole wall/casing (through housing 190) and the piezoelectric sections 170.

Power source 300 may typically be a commercially available high voltage AC power source which can drive the capacitance of the piezoelectric crystals being used (about 40 nano farads per element). Since monitoring wells may be spaced 100 feet to 1000 feet or more distant from the source well, sufficient voltages must be applied to elements 170 [the magnitude of the change in dimension proportional to the voltage applied], such that the generated seismic waves can traverse typical reservoir formations and still be detectable at the monitoring well. In field experiments using lead zirconate or barium titanate piezoelectric elements, is has been found that voltages of between 1 KV and 5 KV, or more are necessary.

The piezoelectric borehole source 100 is designed for permanent or semipermanent operation, and may be left in place for continuous monitoring by intermittent testing. With the device left in the borehole, well operations may be continued without interruption. As described above, several of these devices may be strung at different depths to operate either simultaneously or addressably to provide point sources at different depths. Separate or a single wire pairs can be used to activate the sources individually or all at once, respectively. As the volume of fluid in a fluid filled formation such as an oil reservoir is depleted, the seismic response will vary. By constant monitoring of these responses over predetermined intervals of time, changes in the fluid content and/or type contained within the underground reservoir may be determined.

Compared to the extensive costs of pulling up production tubing, placing an older borehole source, testing, and replacing the production tubing, it may well be much more economical to simply place piezoelectric borehole sources 100 as needed throughout an oil field or other fluid imaging applications.

The description given herein and modes of operation of the invention are presented by way of example and illustration and are not intended to limit the scope of the invention. Many modifications, alternative constructions, and equivalents may be employed without departing from the scope and spirit of the invention.

We claim:

1. An apparatus comprising:
   a tube configured to be disposed about a segment of well production tubing, the segment of well production tubing configured for insertion or extraction of a fluid, a gas, or a combination thereof from a well, the tube being electrically insulating and having an inner diameter that is the same as or larger than an outer diameter of the segment of well production tubing;
   a first piezoelectric element disposed about the tube, the first piezoelectric element being shaped as an open cylinder;
   a housing enclosing the first piezoelectric element and defining a volume;
   an inner conductor in electrical connection with an inner circumference of the first piezoelectric element; and
   an outer conductor in electrical connection with an outer circumference of the first piezoelectric element.

2. The apparatus of claim 1, wherein the outer conductor and the inner conductor are configured to deliver a high voltage signal to the first piezoelectric element, and wherein the high voltage signal is configured to change a dimension of the first piezoelectric element.

3. The apparatus of claim 1, wherein the first piezoelectric element is selected from a group consisting of lead zirconate and barium titanate.

4. The apparatus of claim 1, further comprising:
a pressure compensator coupled to an exterior of the housing, wherein the pressure compensator is configured to equalize a pressure in the volume defined by the housing and an ambient pressure.

5. The apparatus of claim 4, wherein the pressure compensator comprises a hollow tube and a cylinder positioned within the hollow tube, wherein one end of the hollow tube is coupled to the exterior of the housing, and wherein the cylinder is configured to slide in the hollow tube to adjust to changes in the pressure in the volume defined by the housing and the ambient pressure.

6. The apparatus of claim 1, further comprising:
a second piezoelectric element disposed about the tube, the second piezoelectric element being shaped as an open cylinder; and
a compliant material disposed about the tube and disposed between the first piezoelectric element and the second piezoelectric element.

7. The apparatus of claim 1, wherein the tube is configured to be eccentrically disposed about the segment of well production tubing.

8. The apparatus of claim 1, further comprising:
an insulator material disposed in the volume.

9. The apparatus of claim 8, wherein the insulator material comprises an insulator fluid.

10. A seismic source comprising:
a tubular support configured to be positioned about a segment of well production tubing, the segment of well production tubing configured for insertion or extraction of a fluid, a gas, or a combination thereof from a well, the tubular support being electrically insulating and having an inner diameter that is the same as or larger than an outer diameter of segment of well production tubing;
a first piezoelectric element disposed about the tubular support, the first piezoelectric element being shaped as an open cylinder;
a first conductive wire electrically connected to an inner wall of the first piezoelectric element;
a second conductive wire electrically connected to an outer wall of the first piezoelectric element; and
a tubular housing enclosing the first piezoelectric element.

11. The seismic source of claim 10, wherein the tubular housing defines a volume between the first piezoelectric element and the tubular housing.

12. The seismic source of claim 11, further comprising:
an insulating fluid disposed in the volume.

13. The seismic source of claim 10, wherein the first piezoelectric element is selected from a group consisting of lead zirconate and barium titanate.

14. The seismic source of claim 10, wherein the seismic source is configured to be removably secured to the segment of well production tubing.

15. The seismic source of claim 10, further comprising:
a spacer material configured to be disposed between the tubular support and the segment of borehole production tubing.

16. The seismic source of claim 15, wherein the spacer material is configured to asymmetrically position the tubular support about the segment of borehole production tubing.

17. A method for generating borehole source wave, comprising:
(a) positioning a piezoelectric borehole source over a segment of well production tubing, the segment of well production tubing configured for insertion or extraction of a fluid, a gas, or a combination thereof from a well, the piezoelectric borehole source comprising one or more piezoelectric elements disposed about a tube, the tube being electrically insulating and having an inner diameter that is the same as or larger than an outer diameter of the segment of well production tubing;
(b) removably fixing the piezoelectric borehole source to the segment of well production tubing; and
(c) applying an AC voltage to the one or more piezoelectric elements to generate a source wave.

18. The method of claim 17, wherein the one or more piezoelectric elements are immersed in an insulating fluid contained in the piezoelectric borehole source.

19. The method of claim 17, wherein operation (c) comprises:
applying a sine wave current with a frequency of 100 Hz to 5 kHz or more; and
applying the sine wave current at voltages ranging from ±100 V to ±5 kV or more.

20. The method of claim 17, wherein operation (c) comprises:
applying a square wave current with a frequency of 100 Hz to 5 kHz or more; and
applying the square wave current at voltages ranging from ±100 V to ±5 kV or more.

* * * * *